(12) United States Patent
Parmentier et al.

(10) Patent No.: US 8,490,388 B2
(45) Date of Patent: Jul. 23, 2013

(54) SYSTEM AND METHOD FOR OUTLET TEMPERATURE CONTROL OF AN OXIDATION CATALYST

(76) Inventors: Michael Parmentier, Chatillon (BE); Julien Schmitt, Kuntzig (FR)

( * ) Notice: Subject to any disclaimer, the term of this patent is extended or adjusted under 35 U.S.C. 154(b) by 884 days.

(21) Appl. No.: 12/231,064

(22) Filed: Aug. 28, 2008

(65) Prior Publication Data

US 2010/0050609 A1     Mar. 4, 2010

(51) Int. Cl.
*F01N 3/00* (2006.01)
*F01N 3/10* (2006.01)

(52) U.S. Cl.
USPC .............................................. 60/286; 60/295

(58) Field of Classification Search
USPC ............................. 60/285, 286, 295, 299, 300
See application file for complete search history.

(56) References Cited

U.S. PATENT DOCUMENTS

| | | | | |
|---|---|---|---|---|
| 5,193,340 | A * | 3/1993 | Kamihara | 60/286 |
| 5,748,492 | A * | 5/1998 | Vander Heyden et al. | 702/30 |
| 5,938,715 | A * | 8/1999 | Zhang et al. | 701/109 |
| 6,487,852 | B1 * | 12/2002 | Murphy et al. | 60/286 |
| 6,698,192 | B2 * | 3/2004 | Ootake | 60/297 |
| 6,813,882 | B2 * | 11/2004 | Hepburn et al. | 60/286 |
| 6,823,663 | B2 * | 11/2004 | Hammerle et al. | 60/286 |
| 6,928,806 | B2 * | 8/2005 | Tennison et al. | 60/286 |
| 6,990,854 | B2 * | 1/2006 | van Nieuwstadt et al. | 73/114.75 |
| 7,111,455 | B2 * | 9/2006 | Okugawa et al. | 60/295 |
| 7,243,491 | B2 * | 7/2007 | Okugawa et al. | 60/311 |
| 7,992,376 | B2 * | 8/2011 | Forthmann et al. | 60/286 |
| 2004/0226288 | A1 * | 11/2004 | Okugawa et al. | 60/295 |
| 2005/0228572 | A1 * | 10/2005 | Mansbart | 701/108 |
| 2005/0241301 | A1 * | 11/2005 | Okugawa et al. | 60/295 |
| 2005/0284131 | A1 * | 12/2005 | Forthmann et al. | 60/285 |
| 2009/0260348 | A1 * | 10/2009 | Fujino | 60/286 |
| 2009/0277158 | A1 * | 11/2009 | Baird et al. | 60/285 |

FOREIGN PATENT DOCUMENTS

| | | |
|---|---|---|
| DE | 20023426 | 4/2004 |
| JP | 2007-71100 | 3/2007 |
| JP | 2008-267291 | 11/2008 |

OTHER PUBLICATIONS

JP OA (Translation).
EP Search Report dated Dec. 20, 2007.
Hiroshi Inagaki et al: "An adaptive fuel injection control with internal model in automotive engines" Signal Processing and System Control, Factory Automation. Pacific Grove, Nov. 27-30, 1990, Proceedings of the Annual Conference of the Industrial Electronics Society. (IECON), New York, IEEE, US, vol. vol. 1 Conf. 16, Nov. 27, 1990, pp. 78-83, XP000217101 ISBN:0-87942-6004-4 *the whole document*.

* cited by examiner

*Primary Examiner* — Kenneth Bomberg
*Assistant Examiner* — Dapinder Singh
(74) *Attorney, Agent, or Firm* — Thomas N. Twomey

(57) ABSTRACT

An oxidation catalyst temperature control system and method for an engine having an exhaust means including an oxidation catalyst is provided. A post fuel calculation means calculates a value representing a post quantity of fuel to be introduced to generate an exothermic reaction in the oxidation catalyst based on a pre-determined desired outlet temperature of the oxidation catalyst, the calculation using a steady state model of the oxidation catalyst, the steady state model utilizing the exhaust mass flow rate and the inlet temperature of the oxidation catalyst and instruction means to instruct the post quantity of fuel to be introduced to the engine.

30 Claims, 3 Drawing Sheets

SYSTEM AND METHOD FOR OUTLET TEMPERATURE CONTROL OF AN OXIDATION CATALYST

BACKGROUND OF THE INVENTION

The present invention relates to outlet temperature control of an oxidation catalyst and particularly, but not exclusively, to outlet temperature control of an oxidation catalyst for use with a particulate filter regeneration system in diesel vehicle engines.

Regeneration of Diesel Particulate Filters (DPF) requires high exhaust gas temperatures (>550° C.), which are not usual during normal operation of a diesel passenger car. In order to obtain such temperatures, a late injection of fuel in an engine cycle, called a post fuel injection, into the exhaust phase is used to introduce unburned fuel into a Diesel Oxidation Catalyst (DOC) to generate an exothermal reaction. As the DOC is located before the DPF, the increase in temperature of exhaust gas caused by the exothermal reaction in the DOC burns off particulate material in the DPF, enabling additional particulate material to be filtered. In order to reduce thermal stress on the DPF, the outlet temperature of the DOC (inlet of DPF) needs to be controlled to substantially around a target value.

Control of the outlet temperature of the DOC is usually performed by a closed loop controller, such as a standard PID (Proportional-Integral-Derivative) controller, using a temperature sensor at the DOC outlet, the amount of post fuel injection being selected from a table which gives a function of both engine speed and engine load, as well as some compensations for transient conditions.

This type of control has some disadvantages:

it is a non-linear system as the amount of post fuel injection is not proportional to the temperature at the DOC outlet;

variations of exhaust manifold temperatures and/or DOC inlet temperatures are not taken into account, which leads to lack of accuracy of the open-loop term;

variations of ambient conditions may not be taken into account;

delays introduced by the operation of DOC may amplify errors in closed-loop operation;

transient operating conditions, such as variations in speed or load of the engine, usually give different DOC outlet temperatures than corresponding steady state conditions for same speed and load;

any change in the calibration of EGR (Exhaust Gas Recirculation) rate, post injection timing, exhaust flow (throttling), requires a complete recalibration of the post fuel table; and the only way to change the DOC outlet target temperature is to duplicate the calibration, that is, one complete calibration for 600° C. and a further complete calibration for 550° C.

SUMMARY OF THE INVENTION

According to a first aspect of the present invention there is provided an oxidation catalyst outlet temperature control system for an engine having an exhaust means comprising an oxidation catalyst comprising:

a temperature sensing means arranged to measure an inlet temperature of the oxidation catalyst;

an exhaust flow rate measurement means for obtaining an exhaust mass flow rate; and a post fuel injection quantity calculation means, wherein the post fuel calculation injection quantity means calculates a value representing a post quantity of fuel to be introduced to generate an exothermic reaction in the oxidation catalyst based on a pre-determined desired outlet temperature of the oxidation catalyst, the calculation using a steady state model of the oxidation catalyst, characterised in that the steady state model utilising the exhaust mass flow rate and the inlet temperature of the oxidation catalyst and a transient compensation component and instruction means to instruct the post quantity of fuel to be introduced to the engine, wherein the transient compensation component is a function of stored energy in the oxidation catalyst and exhaust mass flow rate.

In certain embodiments, the steady state model of the invention further utilises an initial fuel value corresponding to the fuel introduced to the engine before the post quantity of fuel, a first efficiency fraction corresponding to the fuel burnt between the vehicle engine and the oxidation catalyst, a second efficiency fraction corresponding to the fuel burnt in the engine and a pre-determined desired outlet temperature of the oxidation catalyst.

The steady state model of the invention can be further described by the following equation:

$$\dot{q}_{post} = \frac{1}{1-\text{burn\_frac}_{post}} \left[ \frac{\dot{m} \cdot c_p \cdot (T_o - T_i)}{(1-\eta_{exh\_man}) \cdot \eta_{DOC} \cdot H} - \sum_i \dot{q}_{fi} \cdot (1-\text{burn\_frac}_i) \right],$$

where $\dot{q}_{post}$ is the post fuel value, $T_o$ is the pre-determined desired outlet temperature, $T_i$ is the inlet temperature of the oxidation catalyst, $\dot{m}$ is the exhaust mass flow rate, $$\sum_i \dot{q}_{fi}$$

is the initial fuel value and $$\left[ \sum_i \dot{q}_{fi} \cdot (1-\text{burn\_frac}_i) \right]$$

is the total amount of unburned fuel leaving the engine except the post fuel value, $(1-\eta_{exh\_man})$ is the first efficiency fraction, $(1-\text{burn\_frac}_i)$ is the second efficiency fraction, $c_p$ is the specific heat of the exhaust gas, H is the fuel heating value and $\eta_{DOC}$ is the exothermal efficiency for unburned fuel of the oxidation catalyst.

In some embodiments of the invention, the oxidation catalyst temperature control system further comprises a memory means for storing calibrated values.

In another embodiment of the invention, the first efficiency fraction, the second efficiency fraction and the exothermal efficiency for unburned fuel of the oxidation catalyst are obtained from the stored calibrated values.

In yet another embodiment of the invention, the temperature sensing means further measures an engine outlet temperature and the relevant first efficiency fraction being selected based on engine outlet temperature from a set of pre-defined stored values defining the first efficiency fraction as a function of engine outlet temperature.

The value for the exothermal efficiency for unburned fuel of the oxidation catalyst may be selected based on the inlet temperature of the oxidation catalyst from a set of pre-defined stored values defining a value for the exothermal efficiency for unburned fuel of the oxidation catalyst as a function of inlet temperature of the oxidation catalyst.

The relevant second efficiency fraction may be selected based on an injection crank angle of the vehicle engine from a set of pre-defined stored values defining second efficiency fraction as a function of the injection crank angle.

In a further embodiment of the invention, the steady state model including the transient compensation component corresponds to the following equation:

$$\dot{q}_{post} = \frac{1}{1-\text{burn\_frac}_{post}}\left[\frac{\dot{m} \cdot c_p \cdot \left(T_o - T_i + \frac{dQ_m}{dt}\right)}{(1-\eta_{exh\_man}) \cdot \eta_{DOC} \cdot H} - \sum_i \dot{q}_{fi} \cdot (1-\text{burn\_frac}_i)\right],$$

wherein $dQ_m/dt$ represents the change in stored energy associated with a change in exhaust mass flow rate, and may be is calculated by the difference between the stored energy $Q_m$ and a corresponding filtered value of $Q_m$. Alternatively, $Q_m$ can be selected based on the exhaust mass flow rate.

In some embodiments of the invention, the system further comprises a temperature based closed loop control, which may comprise an internal process model. The internal process model may be a second order filter associated with a pure delay. The closed loop control may comprise a first controller which receives the difference between the internal process model and the measured outlet temperature of the oxidation catalyst and outputs a first controller value which is subtracted from a set outlet temperature to create the pre-determined desired outlet temperature $T_o$. This first controller may be a first order lag filter. The closed loop control may also comprise a second controller which controls the pre-determined desired outlet temperature $T_o$ before it is supplied to the internal process model and the steady state model.

The temperature sensing means may also measure an outlet temperature of the oxidation catalyst.

The second order filter may be represented by the equation:

$$Pm = \frac{e^{-T_d s}}{(1+T_1 s)(1+T_2 s)},$$

where $T_1$ and $T_2$ are filter time constants, which are related to the oxidation catalysts thermal inertia and $T_d$ is a delay corresponding to the physical characteristics of the oxidation catalyst.

According to a second aspect of the present invention there is provided a method of controlling outlet temperature of an oxidation catalyst for an engine having an exhaust means comprising the steps of:

(i) sensing temperature at an inlet of the oxidation catalyst;

(ii) measuring an exhaust mass flow rate in the exhaust means;

(iii) calculating a value representing a post quantity of fuel to be introduced to the engine to generate an exothermic reaction in the oxidation catalyst based on a pre-determined desired outlet temperature of the oxidation catalyst, characterised in that the calculation representing the oxidation catalyst uses a steady state model and utilising the exhaust mass flow rate, the inlet temperature of the oxidation catalyst and compensating the steady state model for transients comprising calculating a compensating function dependent on stored energy in the oxidation catalyst and exhaust mass flow rate; and (iv) instructing a quantity of fuel equivalent to the post fuel value to be introduced to the engine.

According to this second aspect of the invention, step (iii) may further comprise utilising an initial fuel value corresponding to the fuel introduced to the engine before the post quantity of fuel, a first efficiency fraction corresponding to the fuel burnt between the vehicle engine and the oxidation catalyst, a second efficiency fraction corresponding to the fuel burnt in the engine and a pre-determined desired outlet temperature of the oxidation catalyst in the steady state model.

Step (iii) may represent the steady state model by calculating the following equation:

$$\dot{q}_{post} = \frac{1}{1-\text{burn\_frac}_{post}}\left[\frac{\dot{m} \cdot c_p \cdot (T_o - T_i)}{(1-\eta_{exh\_man}) \cdot \eta_{DOC} \cdot H} - \sum_i \dot{q}_{fi} \cdot (1-\text{burn\_frac}_i)\right],$$

where $\dot{q}_{post}$ is the post fuel value, $T_o$ is the pre-determined desired outlet temperature, $T_i$ is the inlet temperature of the oxidation catalyst, $\dot{m}$ is the exhaust mass flow rate, $$\sum_i \dot{q}_{fi}$$

is the initial fuel value and $$\left[\sum_i \dot{q}_{fi} \cdot (1-\text{burn\_frac}_i)\right]$$

is the total amount of unburned fuel leaving the engine except the post fuel value, $(1-\eta_{exh\_man})$ is the first efficiency fraction, $(1-\text{burn\_frac}_i)$ is the second efficiency fraction, $c_p$ is the specific heat of the exhaust gas, H is the fuel heating value and $\eta_{DOC}$ is the exothermal efficiency for unburned fuel of the oxidation catalyst. The method may further comprise storing calibrated values in a suitable memory means.

In one embodiment of the invention, step (iii) further comprises obtaining values for the first efficiency fraction, the second efficiency fraction and the exothermal efficiency for unburned fuel of the oxidation catalyst are from the stored calibrated values in the memory means.

In a further embodiment, the method further comprises the step of measuring an engine outlet temperature and selecting the first efficiency fraction based on the engine outlet temperature from a set of pre-defined stored calibrated values defining the first efficiency fraction as a function of engine outlet temperature.

In another embodiment, the method further comprises the step of selecting the value for the exothermal efficiency for unburned fuel of the oxidation catalyst based on the inlet temperature of the oxidation catalyst from a set of pre-defined stored calibrated values defining the value for the exothermal efficiency for unburned fuel of the oxidation catalyst as a function of inlet temperature of the oxidation catalyst.

In yet another embodiment, the method further comprises the step of selecting the relevant second efficiency fraction based on the injection crank angle of the vehicle engine from a set of pre-defined calibrated stored values defining second efficiency fraction as a function of the injection crank angle.

The steady state model of step (iii) including the compensating function may involve calculating the following equation:

$$\dot{q}_{post} =$$

$$\frac{1}{1 - \text{burn\_frac}_{post}} \left[ \frac{\dot{m} \cdot c_p \cdot \left(T_o - T_i + \frac{dQ_m}{dt}\right)}{(1 - \eta_{exh\_man}) \cdot \eta_{DOC} \cdot H} - \sum_i \dot{q}_{fi} \cdot (1 - \text{burn\_frac}_i) \right],$$

wherein $dQ_m/dt$ represents the change in stored energy associated with a change in exhaust mass flow rate.

Calculating the compensating function comprises calculating the derivative $dQ_m/dt$, which can be represented by the difference between the stored energy $Q_m$ and it's a corresponding filtered value of $Q_m$. Alternatively, $Q_m$ can be selected based on the exhaust mass flow rate.

In yet another embodiment, the method further comprises modifying the pre-determined desired outlet temperature using a closed loop feedback control.

The method may further comprise the step of measuring an outlet temperature of the oxidation catalyst.

The closed loop feedback control may comprise calculating an internal process model.

The internal process model may be a second order filter associated with a pure delay. This second order filter can be described by the equation $$Pm = \frac{e^{-T_d s}}{(1 + T_1 s)(1 + T_2 s)},$$

where $T_1$ and $T_2$ are filter time constants, which are related to the oxidation catalysts thermal inertia and $T_d$ is a delay corresponding to the physical characteristics of the oxidation catalyst.

In some embodiments, the closed loop feedback control comprises performing a first controller calculation on the difference between the internal process model and the measured outlet temperature of the oxidation catalyst, outputting a first controller value, subtracting the first controller value from a set outlet temperature to create the pre-determined desired outlet temperature $T_o$. The first controller calculation may be a first order lag filter. The closed loop control may comprise performing a second controller calculation on the pre-determined desired outlet temperature $T_o$ before it is supplied to the internal process model and the steady state model.

According to a third aspect of the present invention there is provided a Diesel engine incorporating an oxidation catalyst outlet temperature control system according to the first aspect of the present invention for use in a particulate filter regeneration control system.

BRIEF DESCRIPTION OF THE DRAWINGS

Embodiments of the present invention will now be described, by way of example only, with reference to the drawings, in which.

DETAILED DESCRIPTION OF THE INVENTION

As discussed above, prior art solutions to temperature control of a particulate filter regeneration system for a vehicle engine tend to combine measurement of temperature at an oxidation catalyst's outlet with a look-up table giving a defined "post" fuel injection according to engine speed and load.

The present invention is based on an open-loop exothermal model of an oxidation catalyst. That is, a steady state model is used to calculate the quantity of "post" fuel required to generate an exothermal reaction in the oxidation catalyst which provides a required change in temperature at the oxidation catalyst outlet.

The following description may refer to typical reciprocal vehicular engines, but it should be understood that the invention is capable of being applied to any engine which requires a particulate filter capable of regeneration through elevated temperatures. For example, rather than a reciprocal engine, the engine could be a rotary Wankel engine. Furthermore, the fuel source is also unimportant, although it will be appreciated that Diesel engines are most likely to have a particulate filter and, as such, a particulate filter regeneration system fitted.

Figure 1:
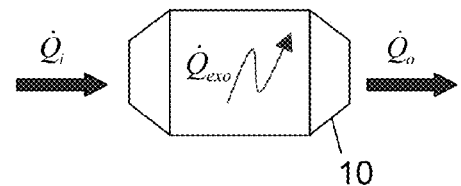
FIG. 1 is a representation of a oxidation catalyst in a particulate filter regeneration system.

Referring to FIG. 1, the steady state model of an oxidation catalyst 10 can be represented by the energy associated with heat at the output of the oxidation catalyst 10 being equal to the heat energy at the input plus the heat energy from the exothermal reaction. This steady state model can be represented by equation 1.

$$\dot{Q}_o = \dot{Q}_i + \dot{Q}_{exo} \quad (1)$$

Where $\dot{Q}_o$ is heat flow at the output of the oxidation catalyst 10, $\dot{Q}_i$ is heat flow at the input of the oxidation catalyst 10 and $\dot{Q}_{exo}$ is heat flow due to an exothermal reaction in the oxidation catalyst 10.

As $\dot{Q} = \dot{m} c_p T$, equation 1 can be broken down as shown in equation 2.

$$\dot{m} \cdot c_p \cdot T_o = \dot{m} \cdot c_p \cdot T_i + \dot{q}_{DOC} \cdot \eta_{DOC} \cdot H \quad (2)$$

Where $q_{fDOC}$ is the unburned fuel at the oxidation catalyst inlet, H is the fuel heating value, $\eta_{DOC}$ is the oxidation catalyst efficiency for unburned fuel (exothermal), m is the exhaust mass flow rate, $c_p$ the specific heat of the exhaust gas, $T_o$ is the oxidation catalyst outlet temperature and $T_i$ is the oxidation catalyst inlet temperature.

The exhaust mass flow rate m and the oxidation catalyst inlet temperature $T_i$ can be easily measured with a gas flow meter and temperature sensor respectively. The oxidation catalyst outlet temperature $T_o$ is the variable which must be controlled and therefore is pre-determined. As the specific heat of the exhaust gas $c_p$ and the fuel heating value H are constants, this leaves only the unburned fuel at the oxidation catalyst inlet $q_{fDOC}$ and the oxidation catalyst efficiency $\eta_{DOC}$ as unknown values.

The unburned fuel at the oxidation catalyst inlet $q_{fDOC}$ depends on the amount of fuel injected into the engine cylinder, the percentage of fuel injected which is burnt in the cylinder and the percentage of fuel burnt prior to reaching the oxidation catalyst (unburnt fuel from the engine cylinder can be burnt in the exhaust manifold, if the manifold is sufficiently hot).

So, the quantity of unburnt fuel exiting the cylinder can be represented by equation 3.

$$\dot{q}_{fEO} = \sum_{pulses\_i} \dot{q}_{fi} \cdot (1 - \text{burned\_fraction}_i) \quad (3)$$

Where $q_{fEO}$ is the unburned fuel at exhaust valve, taking into account the burned fraction of each injection pulse "i", including the "post" fuel injection pulse.

We now have the quantity of fuel exiting the cylinder and equation 4 represents the unburned fuel at the oxidation catalyst inlet $q_{fDOC}$.

$$\dot{q}_{fDOC} = \dot{q}_{fEO} \cdot (1 - \eta_{exh\_man}) \quad (4)$$

Where $\eta_{exh\_man}$ is the "exothermal efficiency" of the exhaust manifold, which is the fraction of fuel burned between the exhaust valve and the oxidation catalyst 10.

Equation 2 can now be rearranged to give the temperature difference between the inlet and outlet of the oxidation catalyst 10, substituting equations 3 and 4 where appropriate, to give equation 5.

$$T_o - T_i = \frac{1}{\dot{m} \cdot c_p} \left[ \sum_i \dot{q}_{fi} \cdot (1 - \text{burn\_frac}_i) \right] \cdot (1 - \eta_{exh\_man}) \cdot \eta_{DOC} \cdot H \quad (5)$$

Figures 2A, 2B, 2C:
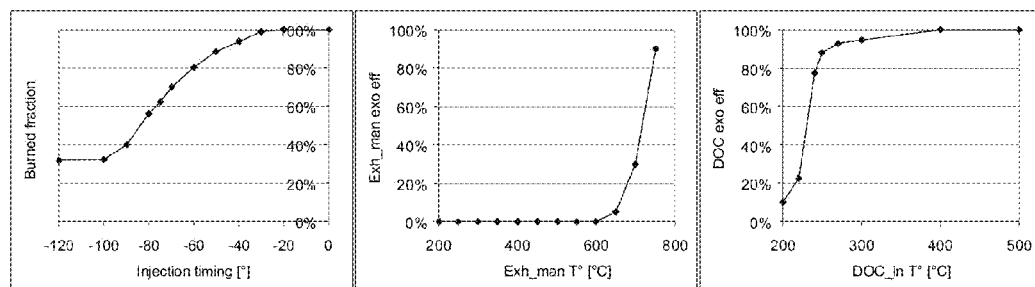
FIGS. 2A, 2B and 2C are calibration graphs for use in a steady state model of the oxidation catalyst.

As shown in FIG. 2A, the fraction of fuel burnt in each fuel injection $\text{burn\_frac}_i$ can then be obtained from a calibration for the particular engine, dependent on the position of the fuel injection in the engine cycle. Furthermore, as shown in FIG. 2B, the "exothermal efficiency" of the exhaust manifold $\eta_{exh\_man}$ is dependant on the temperature at the exhaust manifold and, as such, a calibration can again be performed. Measuring the temperature at the exhaust manifold will therefore enable calculation of its "exothermal efficiency". In the same manner, as shown in FIG. 2C, the oxidation catalyst efficiency $\eta_{DOC}$ is dependent on the inlet temperature of the oxidation catalyst 10. As this temperature is already being measured, or separately modelled, the inlet temperature can be used to also calculate the oxidation catalyst efficiency.

Rearranging equation 5, we can obtain the required post fuel pulse to give the desired output temperature of the oxidation catalyst, as shown in equation 6.

$$\dot{q}_{post} = \frac{1}{1 - \text{burn\_frac}_{post}} \left[ \frac{\dot{m} \cdot c_p \cdot (T_o - T_i)}{(1 - \eta_{exh\_man}) \cdot \eta_{DOC} \cdot H} - \sum_i \dot{q}_{fi} \cdot (1 - \text{burn\_frac}_i) \right], \quad (6)$$

To further improve the accuracy of the required post fuel injection, transient conditions may be considered. A certain amount of energy can be stored in the oxidation catalyst 10 depending on the flow conditions and the physical characteristics of the catalyst 10. A lower flow rate tends to store energy in the catalyst and a higher flow rate tends to release that stored energy, which gives the oxidation catalyst 10 a thermal inertia. Because the amount of stored energy can vary with flow rate, a transient from low flow rate to high flow rate can release the stored energy giving higher outlet temperatures than desired. If the outlet temperature of the oxidation catalyst is too high, the catalyst itself or a downstream particulate filter can be damaged.

Figure 3:
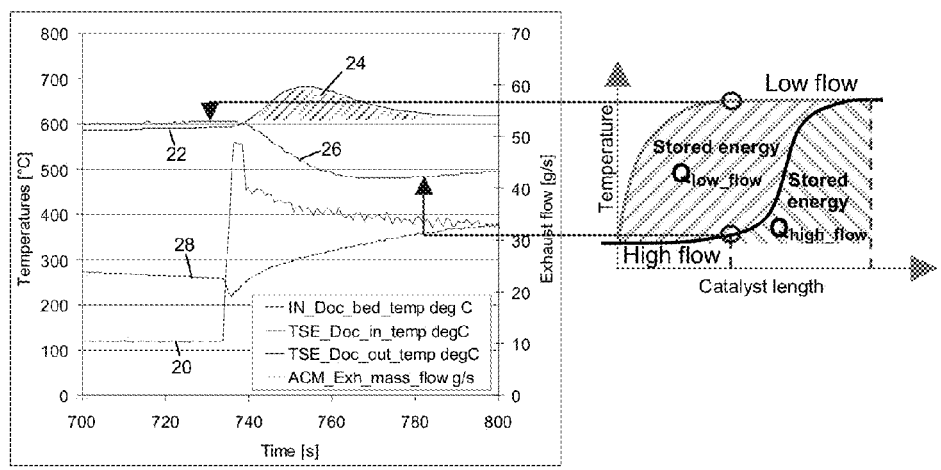
FIG. 3 is a graph showing variations in temperature following a transient condition in a vehicle engine and a graph of temperature and oxidation catalyst length with respect to stored energy therein.

Referring to FIG. 3, a transient in exhaust mass flow rate 20 is shown going from a steady state value of around 10 g/s to about 50 g/s before settling at around 33 g/s. As a result of the increased flow, catalyst outlet temperature 22 rises from around 600° C. to around 680° C. before settling back to nearly 600° C. Shaded area 24, under the catalyst outlet temperature 22, represents the release of the stored energy in the oxidation catalyst 10 due to the higher flow rate. The middle point temperature 26, that is the temperature in the middle of the catalyst, shows that the temperature distribution along the catalyst length changes with flow. This is represented by the graph of catalyst length versus temperature at the right hand side of FIG. 3.

Introducing this transient effect in equation 5 gives:

$$T_o - T_i = \frac{1}{\dot{m} \cdot c_p} \left[ \sum_i \dot{q}_{fi} \cdot (1 - \text{burn\_frac}_i) \right] \cdot (1 - \eta_{exh\_man}) \cdot \eta_{DOC} \cdot H - \frac{1}{\dot{m} \cdot c_p} \frac{dQ_m}{dt} \quad (7)$$

Figure 4:
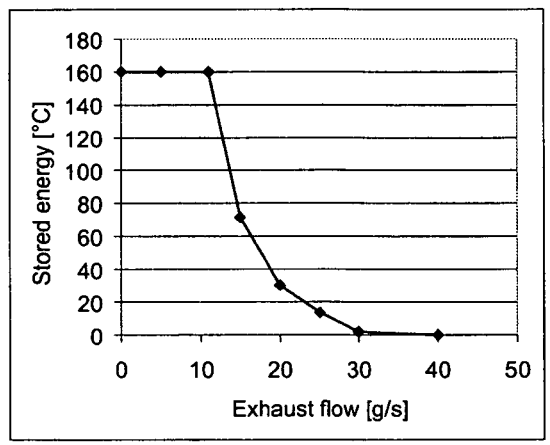
FIG. 4 is a graph of stored energy in a catalyst to exhaust mass flow rate for a particular oxidation catalyst and for use in a model of the oxidation catalyst.

$dQ_m/dt$ is implemented via the calculation of $(Q_m - Q_{filtered})$ where $Q_{filtered}$ is a first order filter of $Q_m$ with a time constant depending on the exhaust flow. $Q_m$ is calibrated via a table depending on the exhaust flow, as shown in FIG. 4.

Once again, rearranging equation 7 to give the post fuel quantity gives equation 8.

$$\dot{q}_{post} = \frac{1}{1 - \text{burn\_frac}_{post}} \left[ \frac{\dot{m} \cdot c_p \cdot \left( T_o - T_i + \frac{dQ_m}{dt} \right)}{(1 - \eta_{exh\_man}) \cdot \eta_{DOC} \cdot H} - \sum_i \dot{q}_{fi} \cdot (1 - \text{burn\_frac}_i) \right] \quad (8)$$

One of the biggest advantages of the open loop model as described above in terms of controls is the linearization of the system. This means that a temperature difference between inlet and outlet is selected and the same temperature difference is measured at the output of the oxidation catalyst, if the model is accurate. It also means that if the desired temperature difference is increased, the measured temperature increases by the same value.

In the real life operation of a particulate filter regeneration system, factors may cause the calibration of the open loop model to become inaccurate, such as any inaccuracies in assumptions made in the system or changes to the oxidation catalyst over time. As such, a closed loop control portion can be added to the system.

In this example, a closed loop controller portion controls the open loop model associated to the particular oxidation catalyst. This means that the closed loop controller works using temperatures and not injected fuel quantities nor engine operating conditions.

In transient operation, the oxidation catalyst is modelled as a second order filter associated to a delay:

$$Pm = \frac{e^{-T_d s}}{(1 + T_1 s)(1 + T_2 s)} \quad (9)$$

The filter time constants ($T_1$ and $T_2$) are related to the thermal inertia of the oxidation catalyst, the delay ($T_d$) is linked to the temperature distribution profile in the oxidation catalyst and s represents the "s-domain" of a Laplace transform function (that is, Pm is a Laplace transform). As described in relation to FIG. 3, the temperature distribution profile mostly depends on the exhaust flow rate. $T_1$, $T_2$ and $T_d$ can be derived from calibration tests by running an engine under different operating conditions and monitoring an oxidation catalyst.

Figure 5:
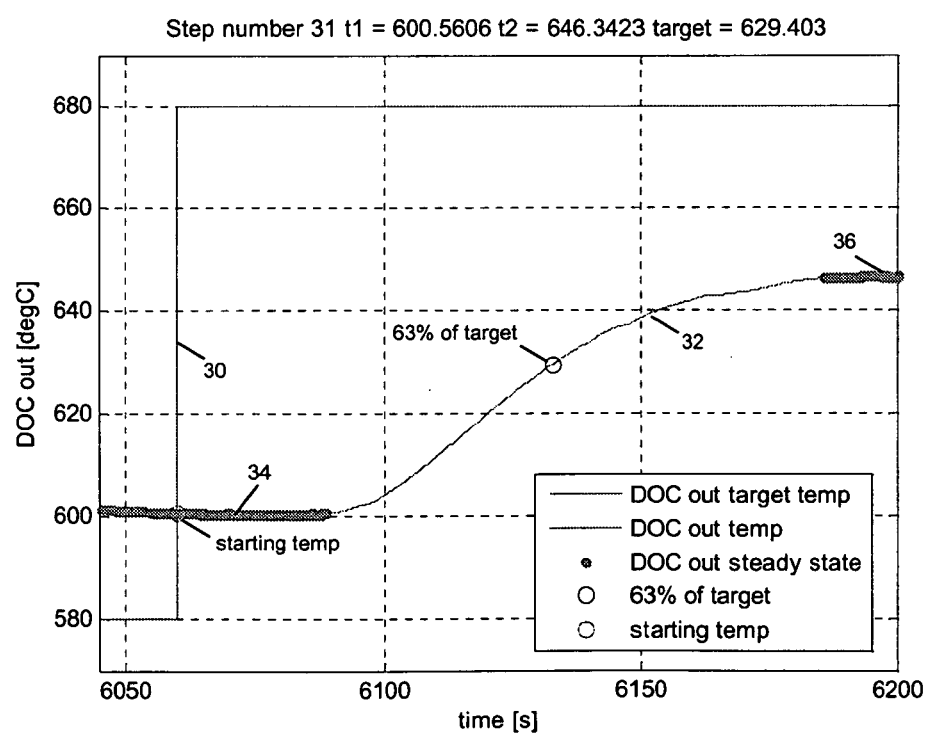
FIG. 5 is a graph showing a step change in desired output temperature and the actual output temperature.

Referring to FIG. 5, a step change on target temperature 30 of the oxidation catalyst outlet, results in a change in actual temperature 32 of the oxidation catalyst outlet from a first steady state level 34 to a second steady state level 36. As can be clearly seen from FIG. 5, there is a delay from the step change on the target temperature 30 to the increase of the actual temperature 32. Furthermore, the change of the actual temperature 32 is not instantaneous but gradual, meaning that the arrival at the second steady state level 36 is a significant time from the original step change of the target temperature 30. Although FIG. 5 shows differences between the target temperature 30 and the actual temperature 32 during steady state conditions, this is simply because the graph used in FIG. 5 was produced from real data but not using a fully calibrated steady state model. It should be appreciated that FIG. 5 demonstrates the delay between a step change in the target temperature 30 and the actual temperature 32 also changing, the actual temperature values being unimportant.

Figure 6:
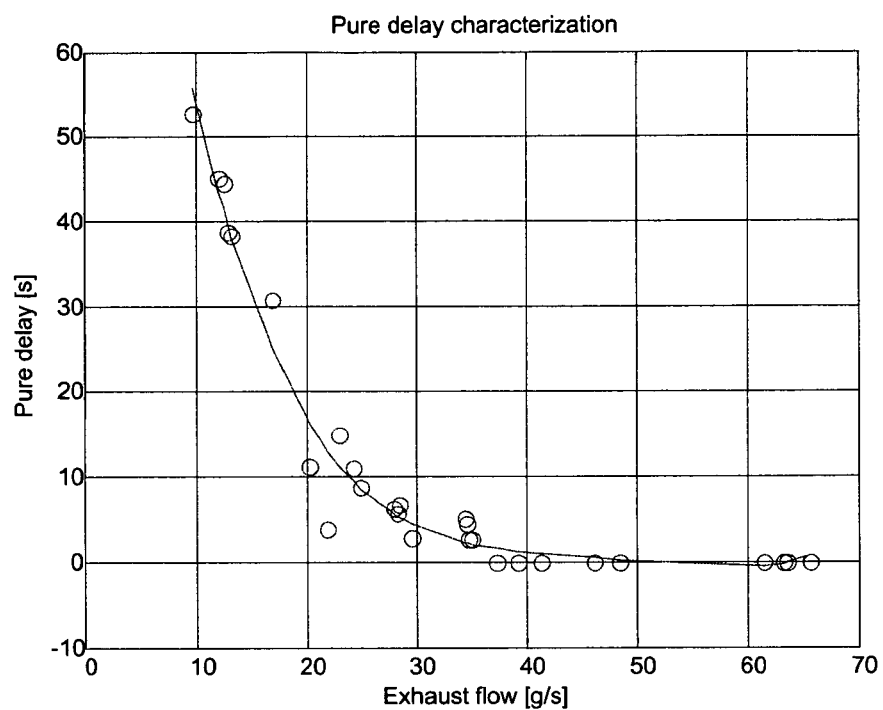
FIG. 6 is a graph of delay in change in output temperature versus exhaust mass flow rate.

The delay shown in FIG. 5 is dependant on the exhaust mass flow rate and an example of the delay versus the exhaust mass flow rate for a particular oxidation catalyst is shown in FIG. 6. This can be obtained by simply applying at different operating points a step change in the target temperature.

As the delay is not negligible compared to the time constants of the process, classical control approaches, such as PID (Proportional-Integral-Derivative) controllers, are not appropriate. Accordingly, the closed loop control is performed using an internal model of the system.

Figure 7:
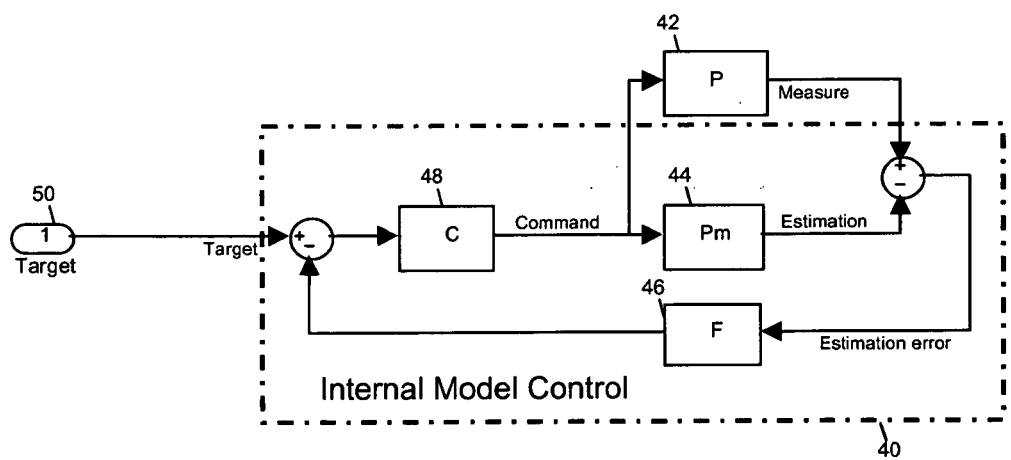
FIG. 7 shows a flow diagram of a closed loop control system and the model of the oxidation catalyst.

Referring now to FIG. 7, a flow diagram showing a closed loop control system 40 and a steady state oxidation catalyst model 42, as described with relation to the open loop control above, is shown. The closed loop control system 40 comprises a closed loop internal process model 44, as represented by equation 9 above, a first perturbation rejection controller 46 and a second closed loop dynamics controller 48.

Compared to classical control approaches, there are two controllers 46 48 instead of one, as would be found in a typical PID controller.

The first controller 46 is used to control the perturbation rejection dynamics. If the process model 44 is perfect, it gives the response of the perturbation rejection. A perturbation can be an error not taken into account in the open loop model 42. All modelling errors are then rejected through the first controller 46. In this example, the first controller 46 is a first order lag filter. The associated time constant of a first order lag filter can be tuned for a compromise between best performance and robustness for the particular system.

The second controller 48 is used to control the closed loop dynamics. In the case of a DPF regeneration system, the temperature set point is constant or changes very slowly and there is no advantage in improving the response to a change in the set point. As such, second controller 48 is chosen to be a unity multiplier and has no effect. It can be envisaged that there may be a desire to improve the response time to the set point and, as such, the second controller 48 can then have an effect on the system.

In use, a target temperature 50 is set at the input to the system (the set point) and is fed through the second controller 48 to the internal process model 44 and the open loop model 42. The open loop model 42 will calculate an appropriate post fuel injection and deliver this accordingly. An outlet temperature is measured at the outlet to the oxidation catalyst in the system, which will correspond, in steady state at least, to the amount of post fuel injection. The internal process model 44 generates an estimation value which is then subtracted from the measured outlet temperature to generate an estimation error. The estimation error is fed in to the first controller 46 and the output of the first controller 46 is subtracted from the target temperature 50.

With closed loop control system 40, the target temperature 50 can be simply adjusted as required and the outlet temperature will respond accordingly because delays and other crucial factors have been explicitly calibrated As such, the outlet temperature can be ramped slowly from no exothermal reaction to the target temperature 50 for a sensitive DPF, such as cordierite.

It will be appreciated that, although the specific example given above relates to a Diesel Particulate Filter, the present invention can be applied to any application for outlet temperature control of an oxidation catalyst. For example, elevated outlet temperatire control of an oxidation catalyst may be useful with Lean Nitrous oxides ($NO_x$) Traps (LNT) desulfation systems and for fast exhaust heat-up.

Further modifications and improvements may be made without departing from the scope of the present invention.

The invention claimed is:

1. A method of controlling a outlet temperature of an oxidation catalyst for an engine having an exhaust means including an oxidation catalyst comprising the steps of:
   (i) sensing temperature at an inlet of the oxidation catalyst;
   (ii) measuring an exhaust mass flow rate in the exhaust means;
   (iii) calculating a value representing a post quantity of fuel to be introduced to the engine to generate an exothermic reaction in the oxidation catalyst based on a pre-determined desired outlet temperature of the oxidation catalyst, characterised in that the calculation representing the oxidation catalyst uses a steady state model utilizing the exhaust mass flow rate, the inlet temperature of the oxidation catalyst and compensating the steady state model for transients comprising calculating a compensating function dependent on stored energy in the oxidation catalyst and exhaust mass flow rate; and
   (iv) instructing a quantity of fuel equivalent to the post fuel value to be introduced to the engine;
wherein the steady state model corresponds to the following equation:

$$\dot{q}_{post} = \frac{1}{1 - \text{burn\_frac}_{post}} \left[ \frac{\dot{m} \cdot c_p \cdot (T_o - T_i)}{(1 - \eta_{exh\_man}) \cdot \eta_{DOC} \cdot H} - \sum_i \dot{q}_{fi} \cdot (1 - \text{burn\_frac}_i) \right],$$

where $\dot{q}_{post}$ is the post fuel value, $T_o$ is the pre-determined desired outlet temperature, $T_i$ is the inlet temperature of the oxidation catalyst, $\dot{m}$ is the exhaust mass flow rate, $$\sum_i \dot{q}_{fi}$$

is the initial fuel value and $$\left[\sum_i \dot{q}_{fi} \cdot (1 - \text{burn\_frac}_i)\right]$$

is the total amount of unburned fuel leaving the engine except the post fuel value, $(1-\eta_{exh\_man})$ is the first efficiency fraction, $(1-\text{burn\_frac}_i)$ is the second efficiency fraction, $c_p$ is the specific heat of the exhaust gas, H is the fuel heating value and $\eta_{DOC}$ is the exothermal efficiency for unburned fuel of the oxidation catalyst.

2. A method as claimed in claim 1, wherein step (iii) further comprises utilizing an initial fuel value corresponding to the fuel introduced to the engine before the post quantity of fuel, a first efficiency fraction corresponding to the fuel burnt between the vehicle engine and the oxidation catalyst, a second efficiency fraction corresponding to the fuel burned in the engine and a pre-determined desired outlet temperature of the oxidation catalyst in the steady state model.

3. A method as claimed in claim 1, wherein the method further comprises storing calibrated values in a suitable memory means.

4. A method as claimed in claim 3, wherein step (iii) further comprises obtaining values for the first efficiency fraction, the second efficiency fraction and the exothermal efficiency for unburned fuel of the oxidation catalyst are from the stored calibrated values in the memory means.

5. A method as claimed in claim 2, wherein the method further comprises the step of measuring an engine outlet temperature and selecting the first efficiency fraction based on the engine outlet temperature from a set of pre-defined stored calibrated values defining the first efficiency fraction as a function of engine outlet temperature.

6. A method as claimed in claim 1, wherein the method further comprises the step of selecting the value for the exothermal efficiency for unburned fuel of the oxidation catalyst based on the inlet temperature of the oxidation catalyst from a set of pre-defined stored calibrated values defining the value for the exothermal efficiency for unburned fuel of the oxidation catalyst as a function of inlet temperature of the oxidation catalyst.

7. A method of controlling a outlet temperature of an oxidation catalyst for an engine having an exhaust means including an oxidation catalyst comprising the steps of:
  (i) sensing temperature at an inlet of the oxidation catalyst;
  (ii) measuring an exhaust mass flow rate in the exhaust means;
  (iii) calculating a value representing a post quantity of fuel to be introduced to the engine to generate an exothermic reaction in the oxidation catalyst based on a pre-determined desired outlet temperature of the oxidation catalyst, characterised in that the calculation representing the oxidation catalyst uses a steady state model utilizing the exhaust mass flow rate, the inlet temperature of the oxidation catalyst and compensating the steady state model for transients comprising calculating a compensating function dependent on stored energy in the oxidation catalyst and exhaust mass flow rate; and
  (iv) instructing a quantity of fuel equivalent to the post fuel value to be introduced to the engine;

wherein the steady state model corresponds to the following equation:

$$\dot{q}_{post} = \frac{1}{1 - \text{burn\_frac}_{post}} \left[ \frac{\dot{m} \cdot c_p \cdot \left(T_o - T_i + \frac{dQ_m}{dt}\right)}{(1 - \eta_{exh\_man}) \cdot \eta_{DOC} \cdot H} - \sum_i \dot{q}_{fi} \cdot (1 - \text{burn\_frac}_i) \right],$$

wherein $\dot{q}_{post}$ is the post fuel value, $T_o$ is the pre-determined desired outlet temperature, $T_i$ is the inlet temperature of the oxidation catalyst, $\dot{m}$ is the exhaust mass flow rate, $$\sum_i \dot{q}_{fi}$$

is the initial fuel value and $$\left[\sum_i \dot{q}_{fi} \cdot (1 - \text{burn\_frac}_i)\right]$$

is the total amount of unburned fuel leaving the engine except the post fuel value, $(1-\eta_{exh\_man})$ is the first efficiency fraction, $(1-\text{burn\_frac}_i)$ is the second efficiency fraction, $c_p$ is the specific heat of the exhaust gas, H is the fuel heating value and $\eta_{DOC}$ is the exothermal efficiency for unburned fuel of the oxidation catalyst, and $dQ_m/dt$ represents the change in stored energy associated with a change in exhaust mass flow rate.

8. A method as claimed in claim 7, wherein calculating the compensating function comprises calculating the derivative $dQ_m/dt$, which can be represented by the difference between the stored energy $Q_m$ and it's a corresponding filtered value of $Q_m$.

9. A method as claimed in claim 7, wherein $Q_m$ is selected based on a function of exhaust mass flow rate.

10. A method as claimed in claim 1, wherein the method further comprises the step of measuring an outlet temperature of the oxidation catalyst.

11. A method as claimed in claim 1, wherein the method further comprises modifying the pre-determined desired outlet temperature using a closed loop feedback control.

12. A method as claimed in claim 11, wherein the closed loop feedback control comprises calculating an internal process model.

13. A method as claimed in claim 12, wherein the internal process model is a second order filter associated with a pure delay.

14. A method as claimed in claim 13, wherein the second order filter is:

$$Pm = \frac{e^{-T_d s}}{(1 + T_1 s)(1 + T_2 s)}$$

where $T_1$ and $T_2$ are filter time constants, which are related to the oxidation catalysts thermal inertia and $T_d$ is a delay corresponding to the physical characteristics of the oxidation catalyst.

15. A method as claimed in claim 10, wherein the method further comprises modifying the pre-determined desired outlet temperature using a closed loop feedback control and wherein the closed loop feedback control comprises performing a first controller calculation on the difference between the internal process model and the measured outlet temperature of the oxidation catalyst, outputting a first controller value, subtracting the first controller value from a set outlet temperature to create the pre-determined desired outlet temperature $T_o$.

16. A method as claimed in claim 15, wherein the first controller calculation is a first order lag filter.

17. A method as claimed in claim 16, wherein the closed loop control further comprises performing a second controller calculation on the pre-determined desired outlet temperature $T_o$ before it is supplied to the internal process model and the steady state model.

18. A method as claimed in claim 7, wherein step (iii) further comprises utilizing an initial fuel value corresponding to the fuel introduced to the engine before the post quantity of fuel, a first efficiency fraction corresponding to the fuel burnt between the vehicle engine and the oxidation catalyst, a second efficiency fraction corresponding to the fuel burned in the engine and a pre-determined desired outlet temperature of the oxidation catalyst in the steady state model.

19. A method as claimed in claim 7, wherein the method further comprises storing calibrated values in a suitable memory means.

20. A method as claimed in claim 19, wherein step (iii) further comprises obtaining values for the first efficiency fraction, the second efficiency fraction and the exothermal efficiency for unburned fuel of the oxidation catalyst are from the stored calibrated values in the memory means.

21. A method as claimed in claim 18, wherein the method further comprises the step of measuring an engine outlet temperature and selecting the first efficiency fraction based on the engine outlet temperature from a set of pre-defined stored calibrated values defining the first efficiency fraction as a function of engine outlet temperature.

22. A method as claimed in claim 7 wherein the method further comprises the step of selecting the value for the exothermal efficiency for unburned fuel of the oxidation catalyst based on the inlet temperature of the oxidation catalyst from a set of pre-defined stored calibrated values defining the value for the exothermal efficiency for unburned fuel of the oxidation catalyst as a function of inlet temperature of the oxidation catalyst.

23. A method as claimed in claim 7, wherein the method further comprises the step of measuring an outlet temperature of the oxidation catalyst.

24. A method as claimed in claim 7, wherein the method further comprises modifying the pre-determined desired outlet temperature using a closed loop feedback control.

25. A method as claimed in claim 24, wherein the closed loop feedback control comprises calculating an internal process model.

26. A method as claimed in claim 25, wherein the internal process model is a second order filter associated with a pure delay.

27. A method as claimed in claim 26, wherein the second order filter is:

$$Pm = \frac{e^{-T_d s}}{(1 + T_1 s)(1 + T_2 s)},$$

where $T_1$ and $T_2$ are filter time constants, which are related to the oxidation catalysts thermal inertia and $T_d$ is a delay corresponding to the physical characteristics of the oxidation catalyst.

28. A method as claimed in claim 24, wherein the method further comprises modifying the pre-determined desired outlet temperature using a closed loop feedback control and wherein the closed loop feedback control comprises performing a first controller calculation on the difference between the internal process model and the measured outlet temperature of the oxidation catalyst, outputting a first controller value, subtracting the first controller value from a set outlet temperature to create the pre-determined desired outlet temperature $T_o$.

29. A method as claimed in claim 28, wherein the first controller calculation is a first order lag filter.

30. A method as claimed in claim 24, wherein the closed loop control further comprises performing a second controller calculation on the pre-determined desired outlet temperature $T_o$ before it is supplied to the internal process model and the steady state model.

* * * * *